No. 847,398. PATENTED MAR. 19, 1907.
C. M. BOWEN.
CULTIVATOR.
APPLICATION FILED MAR. 20, 1906.

2 SHEETS—SHEET 1.

WITNESSES:

Clarence M. Bowen
INVENTOR

By C. A. Snow & Co.
ATTORNEYS

THE NORRIS PETERS CO., WASHINGTON, D. C.

No. 847,398. PATENTED MAR. 19, 1907.
C. M. BOWEN.
CULTIVATOR.
APPLICATION FILED MAR. 20, 1906.
2 SHEETS—SHEET 2.
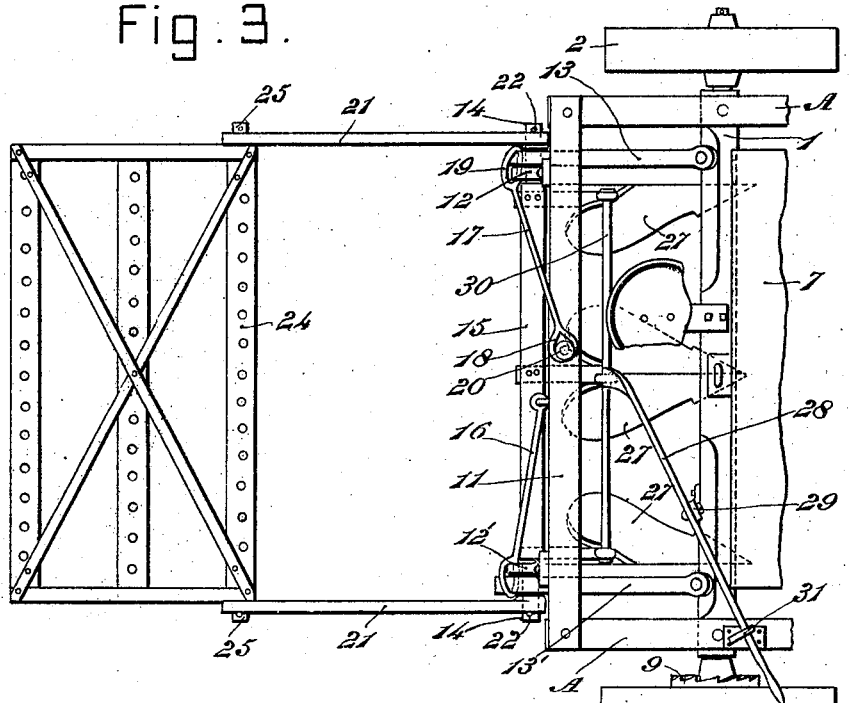
Fig. 3.
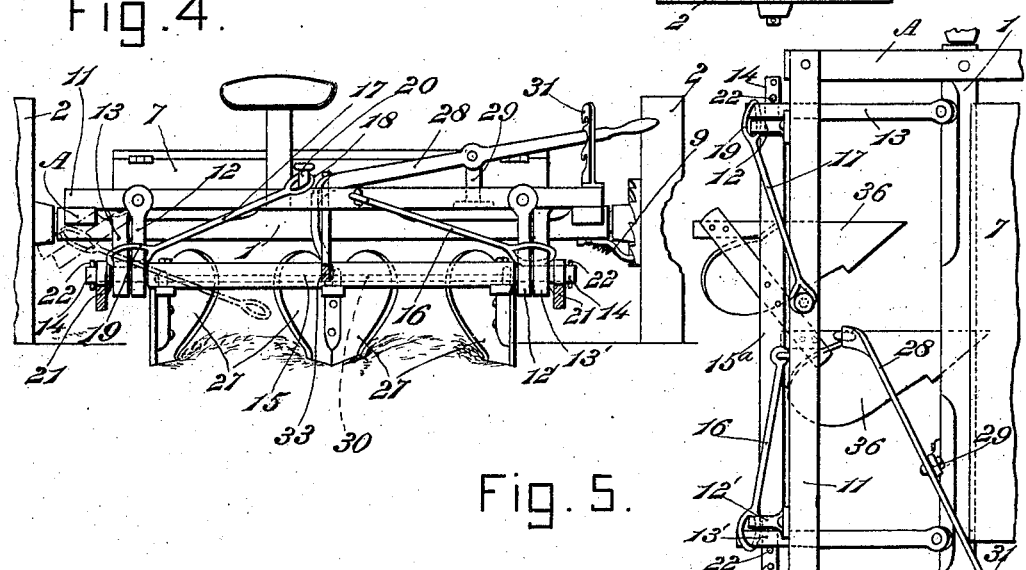
Fig. 4.
Fig. 5.
WITNESSES:
E. F. Stewart
Wm. Bagger
Clarence M. Bowen INVENTOR
By C. A. Snow & Co.
ATTORNEYS
THE NORRIS PETERS CO., WASHINGTON, D. C.

UNITED STATES PATENT OFFICE.

CLARENCE M. BOWEN, OF BOWENS, MARYLAND.

CULTIVATOR.

No. 847,398.  Specification of Letters Patent.  Patented March 19, 1907.

Application filed March 20, 1906. Serial No. 307,094.

*To all whom it may concern:*

Be it known that I, CLARENCE M. BOWEN, a citizen of the United States, residing at Bowens, in the county of Calvert and State of Maryland, have invented a new and useful Cultivator, of which the following is a specification.

This invention relates to agricultural implements for plowing or cultivating the soil, for smoothing or leveling the same by means of harrow or drag, and for depositing seed or fertilizing material; and the objects of the invention are to provide an implement of this class which shall possess superior advantages in point of simplicity, durability, ease and convenience of operation, and general efficiency.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

Figure 1:
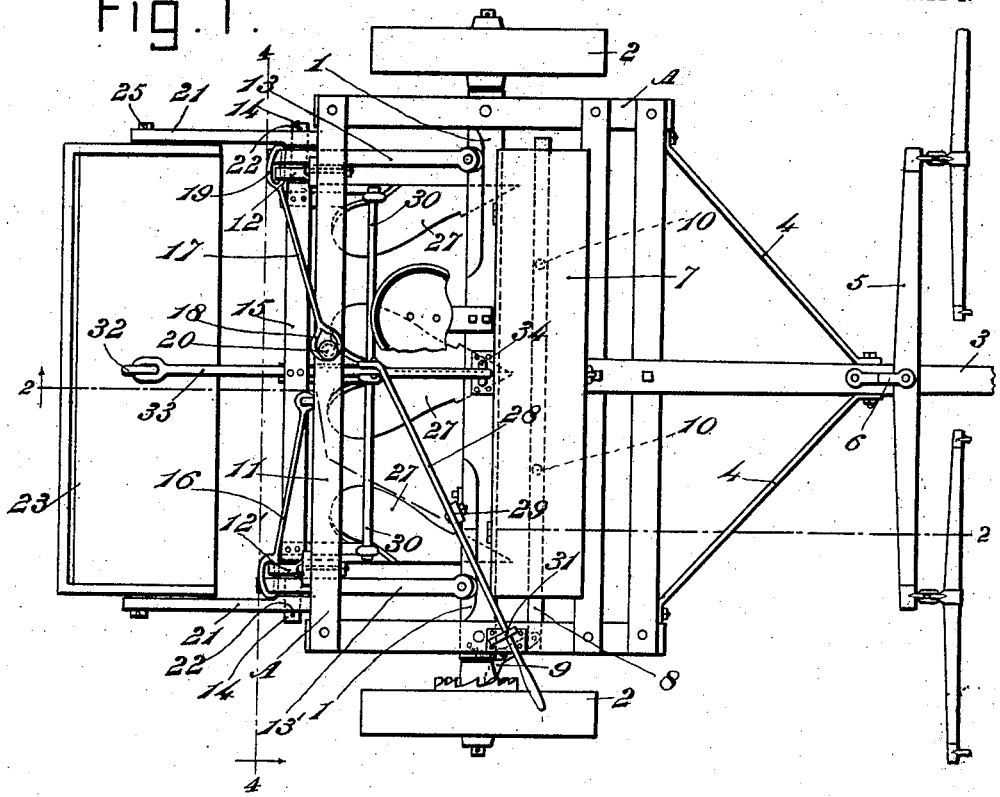
Figure 2:
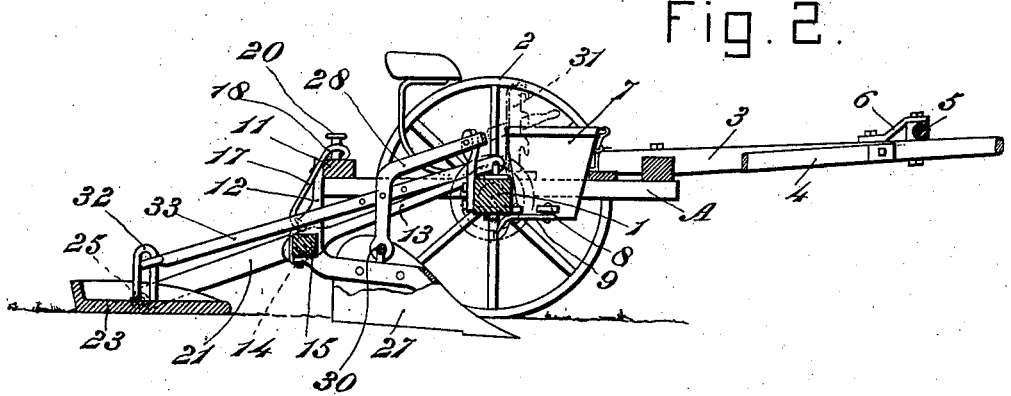

In the drawings, Figure 1 is a top plan view of covering and smoothing or leveling devices constituting the present invention, the same being shown applied to a machine for depositing seed or fertilizing material. Fig. 2 is a longitudinal sectional view of the machine, taken on the plane indicated by the line 2 2 in Fig. 1. Fig. 3 is a top plan view of the machine, showing, however, only the rear portion of the frame and related parts and showing a harrow in place of the drag. Fig. 4 is a transverse sectional view taken on the plane indicated by the line 4 4 in Fig. 1. Fig. 5 is a detail plan view illustrating a modification.

Corresponding parts in the several figures are indicated throughout by similar characters of reference.

In the drawings the present invention has been shown connected to a machine for dropping seed or fertilizer, and said machine, as shown, consists of a frame A, mounted on an axle 1, carried by wheels 2. A tongue 3 extends from the frame and is connected to it by hounds 4. This tongue carries an equalizer 5, connected thereto by a hammer-strap 6 in the usual manner. A seedbox 7 is carried on the frame and has seed-dropping mechanism 8 of any preferred form driven by the wheels through any suitable mechanism, (designated by the numeral 9.) The seedbox has discharge-openings 10. (Shown in dotted lines in Fig. 1.)

It is to be understood that those portions of the machine relating to the seeding mechanism constitute no part of the present invention.

The rear cross-bar 11 of the frame A is provided with depending brackets 12 12', and inclined brackets 13 13' are extended downwardly and rearwardly from the axle 1, said brackets 12 13 and 12' 13' being provided with coinciding or registering apertures for the reception of trunnions 14 at the ends of a cross bar or beam 15. The brackets 12' and 13' are connected with each other and with the rear cross-bar 11 by means of a brace 16, whereby they are retained securely in position. Another brace 17 is provided at one end with an eye 19, connecting and engaging the brackets 12 and 13, and at the other end with an eye 18 for the passage of a pin or bolt 20, whereby it may be detachably connected pivotally with the cross-bar 11 and also connected with the axle 1, so that when the brace 17 is disconnected from the cross-bar 11 by detaching the pin or bolt 20 the said brackets 12 13 will be free to swing to one side for the convenient removal or replacement of the cross-beam 15.

The trunnions 14 of the cross-beam 15 are of such length that they will extend through the bearings in the brackets 12 12' and 13 13' sufficiently to enable a pair of links 21 to be pivotally mounted upon said trunnions, where said links may be secured, as by means of pins 22. These links may be of any desired length, and they serve to carry a leveling implement in the form of a drag 23, as shown in Figs. 1 and 2, or of a harrow 24, as shown in Fig. 3, either of said implements being connected pivotally with the links, as by means of trunnions 25. These trunnions in the case of the harrow are extended laterally from the ends of the front cross-bar of said harrow. In the case of the drag the trunnions are extended laterally from the sides of the drag intermediate the front and rear ends of the latter, so that adjustment of said drag may be had when desired, as will be hereinafter more fully described.

In Figs. 1, 2, and 3 of the drawings the cross-beam 15 has been shown as carrying earth-engaging blades 27, adapted to move the surface soil right and left, so as to cover the seed or fertilizing material discharged through the apertures 10 of the seedbox or hopper. The ridges which are thus formed will be flattened or leveled by the subsequent operation of the drag 23 or the harrow 24, as the case may be.

An adjusting-lever 28, which is fulcrumed upon a post or upright 29, is connected at one end with a cross-bar 30, that connects the scrapers 27 some distance in front of the pivotal bar 15, so that by manipulating the lever the points of the scrapers may be tilted to any desired position which may be deemed convenient for the operation of the device, or the points of the plows may be lifted to an inoperative position when desired, a rack-bar 31 serving to retain the lever 28 and related parts in adjusted position.

The drag 23 is provided with a staple 32, which is disposed about centrally and in alinement with the trunnions 25, said staple being connected by a link-bar 33 with a staple 34 upon the axle 1. Said link-bar is also connected with the lever 28, so that when the latter is manipulated to lift the points of the scrapers 27 to inoperative position the drag will be simultaneously lifted from contact with the soil. The staple 32 is of sufficient dimensions to enable the link-bar 33 to have a sliding connection therewith in order that the points of the scrapers may be depressed to any desired extend without being obstructed by the drag contacting with the surface of the soil.

Under the modification illustrated in Fig. 5 of the drawings there has been substituted for the cross-beam 15, carrying the scrapers 27, a similarly-constructed cross-beam 15ª, carrying turning-plows 36. In Fig. 5 two such plows have been shown; but it is desired to be understood that any desired number of plows capable of being handled by the machine may be mounted upon or connected with the beam 15ª, such plows being preferably disposed in series obliquely with relation to the line of progress. The adjusting-lever 28 is in this case connected with one of the plows to be utilized for the purpose of tilting or oscillating the beam 15ª to elevate or depress the noses of the plows, as may be required.

From the foregoing description, taken in connection with the drawings hereto annexed, the operation and advantages of this invention will be readily understood by those skilled in the art to which it appertains.

By this invention a machine is provided which is applicable by slight changes to a great variety of uses, and the said machine is therefore economical as well as thoroughly efficient for the purpose for which it is provided.

Having thus described the invention, what is claimed is—

1. In a machine of the class described, a frame having an axle and supporting-wheels, pairs of brackets connected with the frame and with the axle and having coinciding apertures, a cross-beam having trunnions pivotally engaging said apertures, and earth-engaging blades carried by said cross-beam.

2. In a machine of the class described, a frame having an axle and carrying-wheels, pairs of brackets connected with the frame and with the axle and having coinciding apertures, a cross-beam having trunnions pivotally engaging said apertures, earth-engaging blades carried by said cross-beam, and means for rocking the cross-beam and for securing it at various adjustments.

3. In a machine of the class described, a frame having an axle and carrying-wheels, pairs of brackets connected with the frame and with the axle and having coinciding apertures one pair of said brackets being pivotally connected with the frame and with the axle, a brace connecting said pivoted brackets, means for bracing the other pair of brackets in stationary relation to the frame, a cross-beam having trunnions pivotally engaging the apertures in the pairs of brackets, earth-engaging blades carried by said cross-beam, a rod connecting the blades, and a lever connected with said rod to effect adjustment of the blades.

4. In a machine of the class described, a frame having an axle and supporting-wheels, brackets connected with the frame and with the axle and having coinciding apertures, a cross-beam having trunnions pivotally engaging said apertures, links mounted upon the trunnions of the beam, and a leveling implement supported by said links.

5. In a machine of the class described, a wheel-supported frame having brackets connected therewith, a cross-beam having trunnions pivoted in said brackets, links pivoted upon the trunnions of the beam, and a leveling implement carried by the links.

6. In a machine of the class described, a wheel-supported frame having brackets, a cross-beam having trunnions pivoted upon said brackets, an adjusting-lever connected with the beam, links pivoted upon the trunnions of the cross-beam, a leveling implement supported pivotally by the links, and a link-bar connecting the leveling implement with a supporting-point said link-bar being connected with the adjusting-lever.

7. In a machine of the class described, a wheel-supported frame having an axle, brackets connected with the frame and with the axle and having coinciding apertures, a cross-beam having trunnions pivotally engaging the apertures in the brackets, an adjusting-lever connected with the beam, links pivoted upon the trunnions of the cross-beam, a leveling implement pivotally supported by the links and having an intermediately-disposed staple, a link-bar loosely engaging the staple at one end and connected at its opposite end with the axle, and means pivotally connecting said link with the adjusting-lever.

In testimony that I claim the foregoing as my own I have hereto affixed my signature in the presence of two witnesses.

CLARENCE M. BOWEN.

Witnesses:
    WM. A. MACKALL,
    GEORGE W. DOWELL.